(12) United States Patent
Butala et al.

(10) Patent No.: US 10,310,791 B2
(45) Date of Patent: Jun. 4, 2019

(54) METHOD OF SCHEDULING PRINT JOBS

(71) Applicant: Océ Holding B.V., Venlo (NL)

(72) Inventors: Kaushal R. Butala, Venlo (NL);
Reinier J. Dankers, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 16/021,915

(22) Filed: Jun. 28, 2018

(65) Prior Publication Data
US 2019/0012126 A1    Jan. 10, 2019

(30) Foreign Application Priority Data

Jul. 6, 2017 (EP) .................................. 17180049

(51) Int. Cl.
*B41J 2/21* (2006.01)
*B41J 2/165* (2006.01)
*G06F 3/12* (2006.01)

(52) U.S. Cl.
CPC ............ *G06F 3/1263* (2013.01); *B41J 2/165* (2013.01); *B41J 2/16526* (2013.01); *B41J 2/2117* (2013.01); *G06F 3/121* (2013.01); *G06F 3/126* (2013.01); *G06F 3/1211* (2013.01); *G06F 3/1229* (2013.01); *G06F 3/1296* (2013.01); *B41J 2002/16573* (2013.01); *G06F 3/1219* (2013.01); *G06F 2206/1514* (2013.01)

(58) Field of Classification Search
CPC ..... B41J 11/485; B41J 13/0009; G06K 15/00; G06K 15/021; G06K 15/022; G06K 15/16; G06K 15/1823; H04N 1/2323; H04N 1/2353; H04N 1/00175; H04N 1/00482; H04N 1/00965; H04N 1/2158;
(Continued)

(56) References Cited

U.S. PATENT DOCUMENTS 8,922,821 B2 * 12/2014 Yamazaki .......... G03G 15/5066
 358/1.1
9,030,690 B2 * 5/2015 Fukuda ................. G06F 3/1263
 358/1.14
(Continued)

OTHER PUBLICATIONS

Search Report issued in European priority application 17180049.3, dated Dec. 15, 2017.

*Primary Examiner* — Negussie Worku
(74) *Attorney, Agent, or Firm* — Birch, Stewart, Kolasch & Birch, LLP

(57) ABSTRACT

A method of scheduling print jobs for printing on a printer which has printing elements provided for printing in a number of different colors, characterized by the steps of:
a) calculating, for each color, a constraint time which specifies a time at which the printing elements for the respective color should be either operated or subjected to a maintenance treatment in order to avoid a risk of malfunction;
b) calculating, for each of a plurality of print jobs that have been scheduled already and are waiting in a print queue, an operation time at which the printing elements will be operating in the course of the processing of the print job; and
c) when a new print job is to be scheduled and the print jobs, including the new print job, comprise at least one job in which printing elements for at least one color are not operated, determining a sequence of the print jobs in the print queue, with corresponding recalculation of the constraint times and operation times, with an aim to extend the constraint times by operating the printing elements before expiry of their previously calculated constraint times.

19 Claims, 7 Drawing Sheets

(58) Field of Classification Search
CPC ....... H04N 1/32502; H04N 2201/0008; H04N 2201/0051; H04N 2201/0094; G03G 15/502; G03G 15/5041; G03G 15/5062; G03G 15/5066; G03G 15/5083; G03G 15/6508; G06F 2206/1514; G06F 3/1203; G06F 3/1215; G06F 3/122; G06F 3/1229; G06F 3/1231; G06F 3/1244; G06F 3/1256; G06F 3/1258; G06F 3/126; G06F 3/1264; G06F 3/1296
USPC .............................. 358/1, 15, 1.9, 442, 443
See application file for complete search history.

(56) References Cited

U.S. PATENT DOCUMENTS

| | | | | |
|---|---|---|---|---|
| 2008/0235158 | A1* | 9/2008 | Manchala | G06Q 10/06316 705/400 |
| 2008/0239368 | A1* | 10/2008 | Ota | G06F 3/1204 358/1.15 |
| 2010/0053664 | A1* | 3/2010 | Mandel | G06F 3/1211 358/1.15 |
| 2010/0195141 | A1* | 8/2010 | Fan | G06F 3/126 358/1.15 |
| 2010/0277764 | A1* | 11/2010 | Yamazaki | G03G 15/5066 358/1.15 |
| 2011/0310428 | A1* | 12/2011 | Ciriza | G06F 1/3203 358/1.15 |
| 2012/0194579 | A1* | 8/2012 | Fujinaga | B41J 11/485 347/5 |
| 2014/0268214 | A1* | 9/2014 | Soriano | G06F 3/126 358/1.15 |
| 2014/0355031 | A1* | 12/2014 | Fukuda | G06F 3/1263 358/1.14 |
| 2015/0379385 | A1 | 12/2015 | Fukata | |
| 2016/0103645 | A1 | 4/2016 | Elchlepp et al. | |
| 2017/0102905 | A1* | 4/2017 | Westerhoff | G06F 3/1203 |

* cited by examiner

Fig. 8
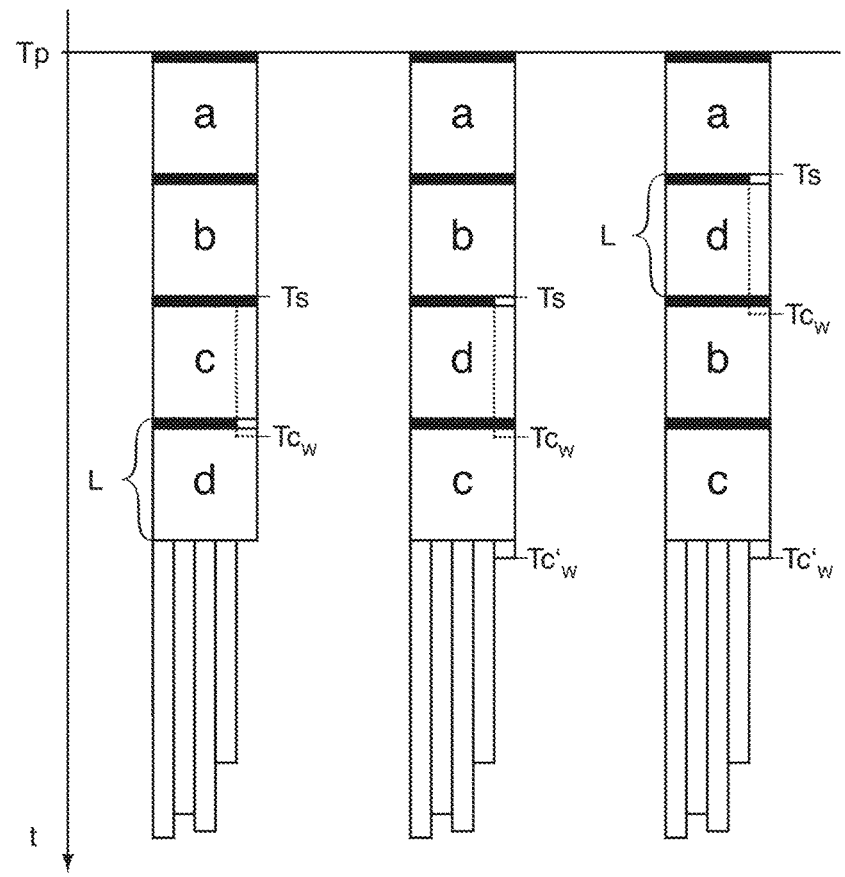
Fig. 9
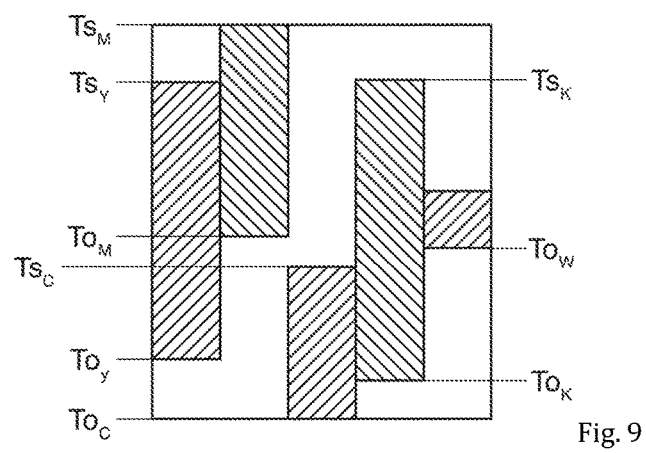
Fig. 9

METHOD OF SCHEDULING PRINT JOBS

CROSS REFERENCE TO RELATED APPLICATIONS

This application claims priority under 35 U.S.C. § 119(a) to application Ser. No. 17/180,049.3, filed in Europe on Jul. 6, 2017, the entire contents of which is hereby incorporated by reference into the present application.

BACKGROUND OF THE INVENTION

Field of the Invention

The invention relates to a method of scheduling print jobs for printing on a printer which has printing elements provided for printing in a number of different colors.

More particularly, the invention relates to a method of scheduling print jobs for an ink jet printer.

Background of the Invention

In certain printing systems, such as ink jet printing systems, the printing elements are allowed to be idle only for a limited time. When the idle time limit is exceeded, there is a risk of malfunction of the printing elements, because ink dries out in the printing element, for example. In an ink jet printer, the ink is jetted out from small nozzle orifices, and a main reason of malfunction is that the nozzle orifices may become clogged with dried ink.

Several techniques of maintenance treatment are known for preventing malfunction of the printing elements when the idle time limit is exceeded. For example, a print head carriage of an ink jet printer may be moved to a maintenance station where the nozzles of the print heads are flushed with ink or with a cleaning liquid and/or a nozzle plate, in which the nozzle orifices have been formed, is cleaned by means of a wiper. Another technique of maintenance treatment is to cause the printing elements to "spit" onto the recording medium before the idle time limit is exceeded. The inks dots that are spit onto the recording medium are not actually wanted for forming an image, but since the dots are very small and are sparsely distributed over the image area, they are practically not perceptible in the printed image and may therefore be tolerated. Nevertheless, too frequent spitting operations may compromise the print quality. On the other hand, moving the print head or print head carriage to a maintenance station is a time-consuming operation and therefore compromises productivity.

In multi-color printing, the permissible idle times, which will be termed "failure times" hereinafter may be different for inks of different colors. Moreover, some colors may be used more frequently than others. For example, white ink is used only relatively rarely, and there may even be print jobs which do not use white ink at all, so that idle times tend to be long.

SUMMARY OF THE INVENTION

It is an object of the invention to improve the productivity in multi-color printing without compromising the print quality.

In order to achieve this object, the method of scheduling print jobs according to the invention is characterized by the steps of:

a) calculating, for each color, a constraint time which specifies a time at which the printing elements for the respective color should be either operated or subjected to a maintenance treatment in order to avoid a risk of malfunction, due to causes such as ink drying out in the printing element;

b) calculating, for each of a plurality of print jobs that have been scheduled already and are waiting in a print queue, an operation time at which the printing elements will be operating in the course of the processing of the print job; and c) when a new print job is to be scheduled and the print jobs, including the new print job, comprise at least one job in which printing elements for at least one color are not operated, determining a sequence of the print jobs in the print queue, with corresponding calculation of the new constraint times and new operation times, with an aim to extend the constraint times by operating the printing elements before expiry of their previously calculated constraint times by shifting the constraint times to the future due to the usage of the corresponding colors.

The constraint time for a given color can be calculated by adding the failure time for that color to the time at which the printing elements for this color have last been used. When the printing elements are operated again before the expiry of the constraint time, this means that the printing elements are flushed with ink, which is equivalent to a maintenance treatment, the operation time can be taken as a new time of last use of the printing elements and a new, later constraint time can be calculated by adding the failure time to the latest operation time. Thus, depending upon the nature of the print jobs to be processed, it is frequently possible to extend the constraint times and thereby to decrease the frequency of maintenance treatments by arranging the print jobs such that all printing elements are operated in intervals which are shorter than the failure times. In general, this can be achieved by arranging the print jobs such that printing jobs which do not utilize a certain color are distributed as evenly as possible among the other print jobs which use that color.

Of course, if the print jobs to be processed comprise a large number of jobs which do not utilize a certain color and only a few jobs in which this color is used, it may not be possible to avoid maintenance treatments completely by employing the method according to the invention. In many cases, however, the mix of print jobs utilizing and not utilizing a given color will be such that the invention can achieve a substantial gain in productivity.

More specific optional features of the invention are indicated in the dependent claims.

BRIEF DESCRIPTION OF THE DRAWINGS

Embodiment examples will now be described in conjunction with the drawings, wherein:

FIGS. 6 to 8 are diagrams illustrating principles of a method according another embodiment of the invention; and FIG. 9 is a diagram illustrating a possible refinement of the method according to the invention.

DETAILED DESCRIPTION OF THE PREFERRED EMBODIMENTS

Figure 1:
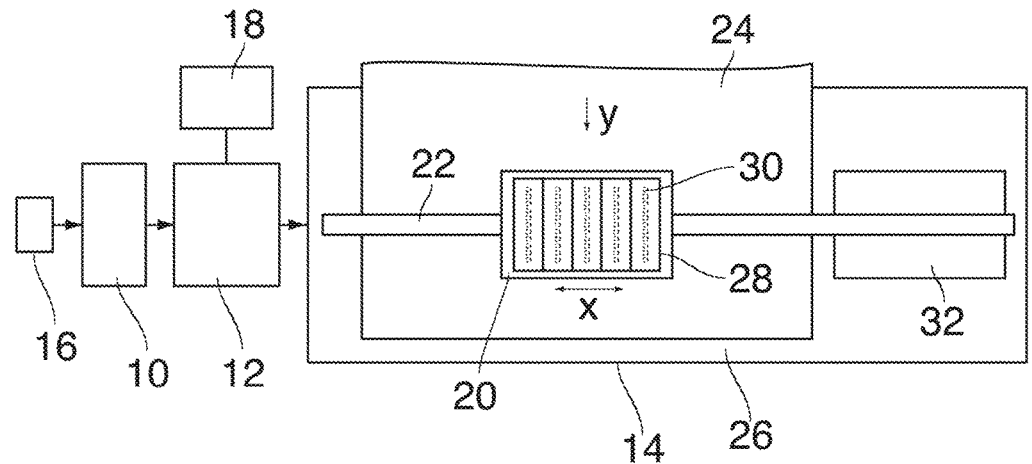
FIG. 1 is a schematic view of a printing system to which the invention is applicable.

FIG. 1 shows an ink jet printing system comprising a raster image processing system 10, a scheduler 12 and a printer 14.

Print jobs 16 to be processed are supplied to the raster image processing system 10 in the form of electronic files and are converted into digital raster images to be sent to the printer where they will be processed (printed) one after the other.

The method according to the invention is implemented in the scheduler 12 in the form of a computer program and determines a sequence in which the raster images are sent to the printer 14 for being printed as well as the timings at which the print process for each print job will start. To that end, the raster image processing system 10 provides information on the length of each job, either explicitly in the form of a job duration or implicitly, for example in the form of the size of the image to be printed or even the actual content of the image to be printed. The length is conveniently expressed by a time that the print engine needs for completing the print job. A user interface 18 is connected to the scheduler 12 and has a display which permits to display and possibly edit the job schedule that has been established by the scheduler 12.

The printer 14 has a carriage 20 which is movable along a guide rail 22 in a direction indicated by a double arrow x in order to scan a print substrate 24 that is supported on a print surface 26 and is advanced step-wise in a sub-scanning direction y. A number of print heads 28 are mounted on the carriage 20. Each print head 28 has an array (a row) of printing elements 30 constituted by nozzles which face the print substrate 24 so as to eject ink droplets onto the print substrate in a pattern specified by the raster image to be printed. In the example shown, the carriage 20 has five print heads 28 disposed side by side, each print head being provided for printing with ink in a different color. The colors of the inks may for example be yellow (Y), magenta (M), cyan (C), black (K) and white (W). The information on which of these colors is to be used in a given print job is available in the raster image processing system 10 and is provided also to the scheduler 12.

The guide rail 22 extends beyond a lateral edge of the print substrate 24 and permits to move the carriage 20 to a maintenance station 32 where the printing elements 30 of all five print heads 28 may be subjected to a maintenance treatment such as flushing, for example.

When a printing element 30 has been operated and is then not operated for a longer time, there is a risk that the ink may dry out and clog the nozzle, so that a nozzle failure must be expected. In order to avoid such nozzle failures, the printing elements 30 should be operated in time intervals which are not longer than a certain time limit which will be called "failure time", because nozzle failures must be expected if the failure time is exceeded. The failure time depends among others upon the chemical composition of the ink and may therefore be different for inks with different colors.

Figure 2:
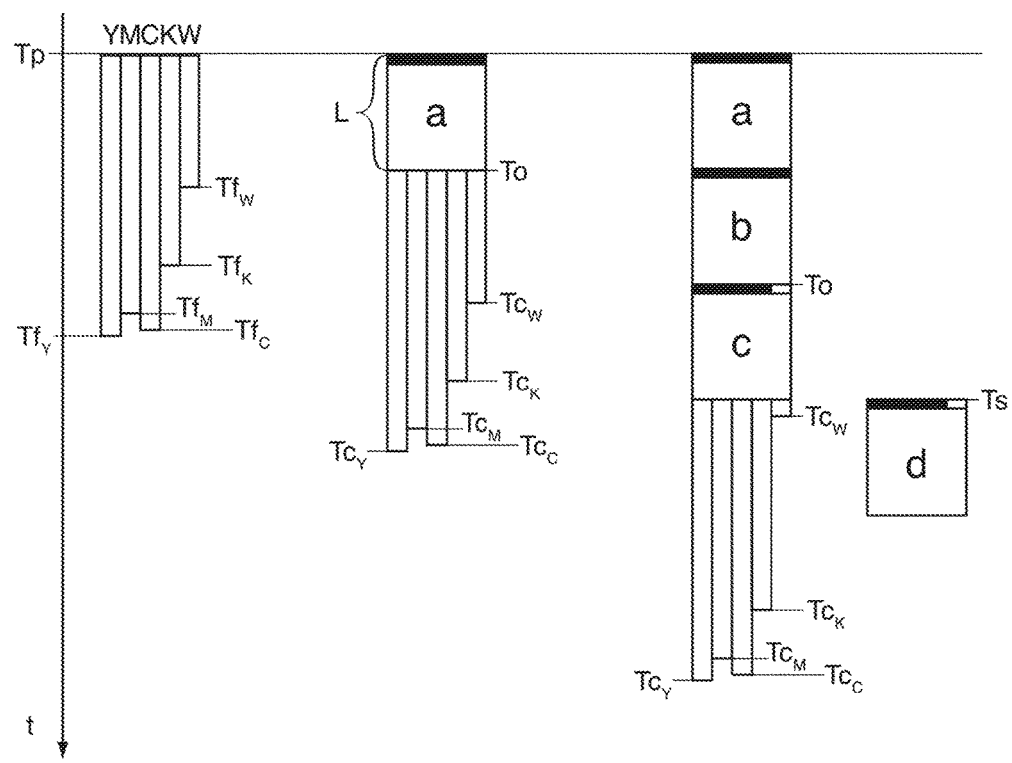
FIG. 2 is a diagram illustrating a build-up of a print queue.

FIG. 2 is a time diagram with a vertical (downwardly directed) time axis t. The left column in the diagram shows the failure times $Tf_Y$, $Tf_M$, $Tf_C$, $Tf_K$ and $Tf_W$ for the five colors Y, M, C, K and W. It can be seen that, in this example, the failure time $Tf_W$ for white ink is particularly small.

The center column in the diagram in FIG. 2 represents a situation where a single print job "a" has been scheduled for printing. The print job is represented by a rectangle with a length L in the direction of the time axis. This length, the job length, represents the time that will be needed for printing the entire job which may comprise one or more pages (i.e. one or more substrate sheets to be printed on). A continuous black bar at the top edge of the rectangle indicates symbolically that all five colors are scheduled for being used in this print job, so that all printing elements 30 of all print heads 28 will be used during the execution of the print job. Theoretically, there is a possibility that certain printing elements 30 will not be used, depending on the contents of the images to be printed. However, in print jobs of reasonable size the likelihood that a printing element is not operated at all is negligibly small.

For simplicity, it shall be assumed in this example that all five print heads 28 are operating as soon as the print processing starts at a time Tp (the present) and keep operating until the entire job has been completed at a time To which will be designated as "operation time" of the print job because it is a time where the printing elements are still operating. In fact, in this example, the operating time marks the last time instant at which the printing elements are operating in processing this particular print job "a". It is noted though that in practice the operation time To differs for each color, and even differs for individual printing elements. For simplicities sake, we assume in this discussion that the operation time To is equal for all colors that are used by a print job.

As long as no subsequent print job is scheduled, it must be assumed that the printing elements will be idle, i.e., not operating, after the time To. Consequently, a nozzle failure of the printing elements for white ink cannot be excluded when a constraint time $Tc_W$ is reached and exceeded. As has been shown diagrammatically in FIG. 2, the constraint time $Tc_W$ is the sum of the operation time To and the failure time $Tf_W$.

The center column in FIG. 2 further shows corresponding constraint times $Tc_Y$, $Tc_M$, $Tc_C$, and $Tc_K$ for each of the four other colors.

The rightmost column in FIG. 2 illustrates a situation where two further print jobs "b" and "c" have been scheduled and a fourth print job "d" has just been received and is to be scheduled. As indicated by the black bars for the different print jobs, the job "b" will utilize all five colors whereas the job "c" does not use the color W, as is symbolized by a white blank in the black bar.

Since all printing elements will be operated when the processing of the job "b" starts and will keep operating until the job is completed, the failure times will now have to be counted from the end (operation time To) of the job "b", so that, at the time when the job "b" is added to the print queue, all constraint times $Tc_Y$, . . . , $Tc_W$, are extended, i.e. shifted to the future by the job length of the job "b". Similarly, the constraint times $Tc_Y$-$Tc_K$ are extended once again by the job length of the job "c" because these colors are also used in the job "c". However, since the job "c" does not use the color W, the constraint time $Tc_w$ is not extended. In the example shown, this constraint time is reached already shortly after the end of the job "c".

The new job "d", which has just been received, will naturally be added at the end of the job "c". Thus, at a start time Ts of the job "d", none of the constraint times has expired, so that no nozzle failures need to be feared during the processing of the job "d". It will be observed that, since the job "d" does not use the color W, the constraint time $Tc_w$ will be reached during the processing of the job d. However, since white ink is not utilized in this job, anyway, the expiry of the constraint time does not affect the print quality in job "d".

Figure 3:
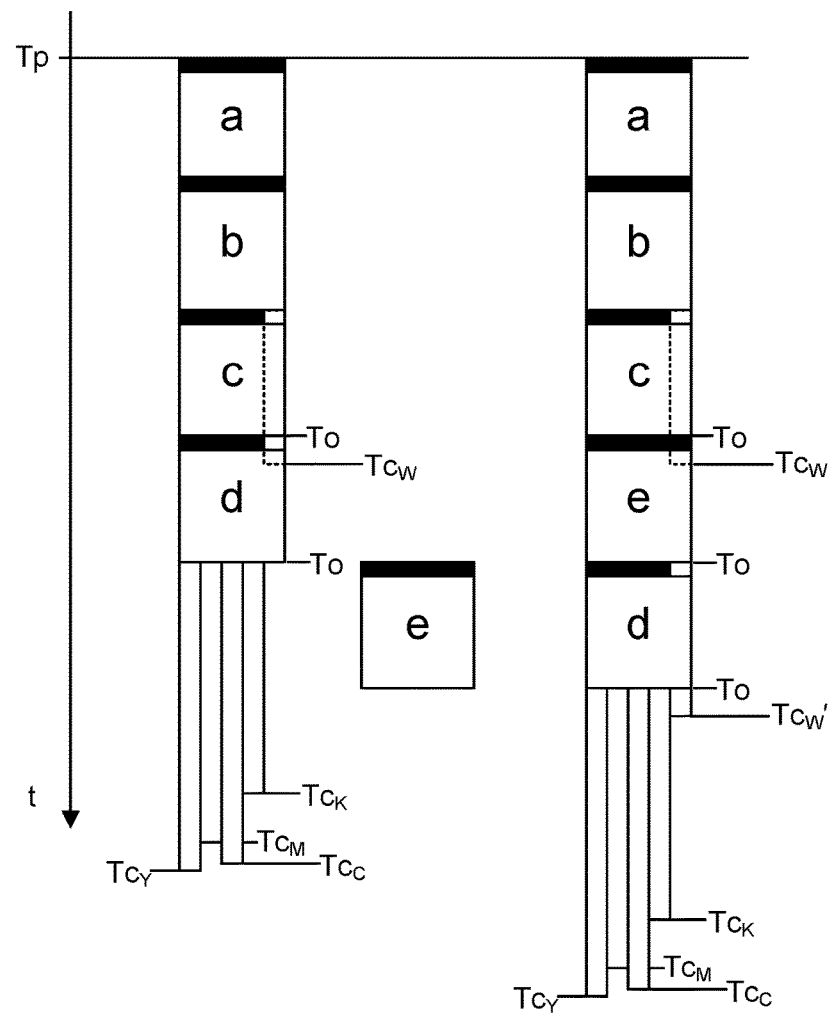
FIGS. 3 and 4 are diagrams illustrating principles of a method according to an embodiment of the invention in different scenarios.

In the diagram in FIG. 3, the left column illustrates a situation where the job "d" has been added to the end of the print queue, and another job "e" has been received which is scheduled for printing with all five colors. Since the white printing elements could not be "refreshed" by processing the jobs "c" and "d", the constraint time $Tc_w$ for white has expired. Consequently, when the job "e" would be added at the end of the print queue and the printing elements for white would be needed again in this job, it must be expected that the print quality is degraded because nozzle failures occur for the white ink. Normally, this would mean that a time-consuming maintenance treatment would have to be scheduled for the time after completion of the job "d", and job "e" could only be started at a somewhat later time.

According to the invention, however, the maintenance treatment is avoided by inserting the job "e" between the jobs "c" and "d", as has been shown in the right column in FIG. 3. The jobs "c" and "d" between which the new job "e" is inserted have the property that the constraint time $Tc_w$, which is the earliest constraint time amongst all colors, falls within the interval between the operation times To of the jobs "c" and "d". In general, the due maintenance treatment can be avoided or at least delayed by searching the print queue for a pair of consecutive print jobs which have the above-mentioned feature that the earliest constraint time falls between the operation times of these two jobs.

The insertion of the job "e" has the consequence that the constraint time $Tc_w$ is extended until after the operation time of job "d" ($Tc_w'$). Thus, when another job would be received for which white ink would be needed, the constraint time is extended further by inserting this new job after the job "d".

Figure 4:
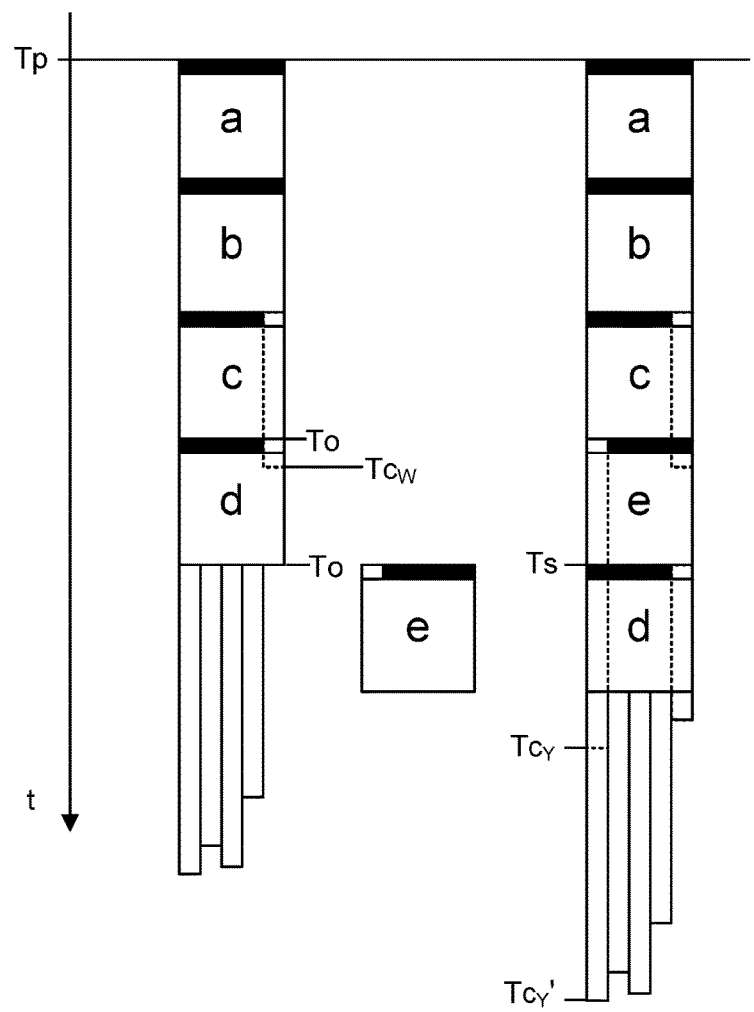

In FIG. 4, the left column illustrates a situation which differs from the left column in FIG. 3 in that the new job "e" does not utilize the color Y. Since it does use the color W, however, there is again a risk of nozzle failure for white ink because the constraint time $Tc_w$ has expired. Applying the principles explained above, the new job "e" is inserted between new jobs "c" and "d", as illustrated in the right column. It can be seen that the constraint time $Tc_Y$ for yellow ink is still later than the start time Ts of job "d" which needs yellow ink, so that yellow ink can also be printed without risk of failure. Note that due to the fact that job "d" utilizes the color Y, the constraint time $Tc_Y$ is extended to $Tc_Y'$.

There may be situations however where the strategy described so far does not lead to the desired result. For example, if a job that does not utilize a particular color is simply longer than the failure time of that particular color, rearranging the jobs can never result in the start time Ts of a subsequent job utilizing the color falling before the constraint time Tc of the particular color. In such a situation a maintenance treatment cannot be avoided.

A similar situation may occur when there are only a few jobs utilizing a particular color among a large number of jobs not utilizing the particular color, there may simply not be enough jobs utilizing the particular color to prevent the constraint time Tc from expiring occasionally.

Furthermore, especially in printers having larger number of color channels, for example twelve: three main process colors cyan (C), magenta (M), and yellow (Y), a lighter version of the main process colors light cyan (C'), light magenta (M'), and light yellow (Y'), and further white (W), black (B), a number of gray levels ($G_1$, $G_2$, $G_3$), and a varnish (V), the chance that print jobs do not utilize all colors is very realistic. In such situations following the principles outlined above, may lead to some iteration producing an earlier tried job sequence, so that the process would get locked in an endless loop.

It should therefore be provided that the scheduling process is forcefully stopped as soon as a sequence is reached which had already been tested before. In that case, a maintenance treatment cannot be avoided and consequently a maintenance treatment is scheduled.

In a modified embodiment it may be stipulated that the scheduling process is aborted as soon as it is found that there is still a risk of nozzle failure after a first re-arrangement of the print queue. In that case, a maintenance treatment would be scheduled.

Figure 5:
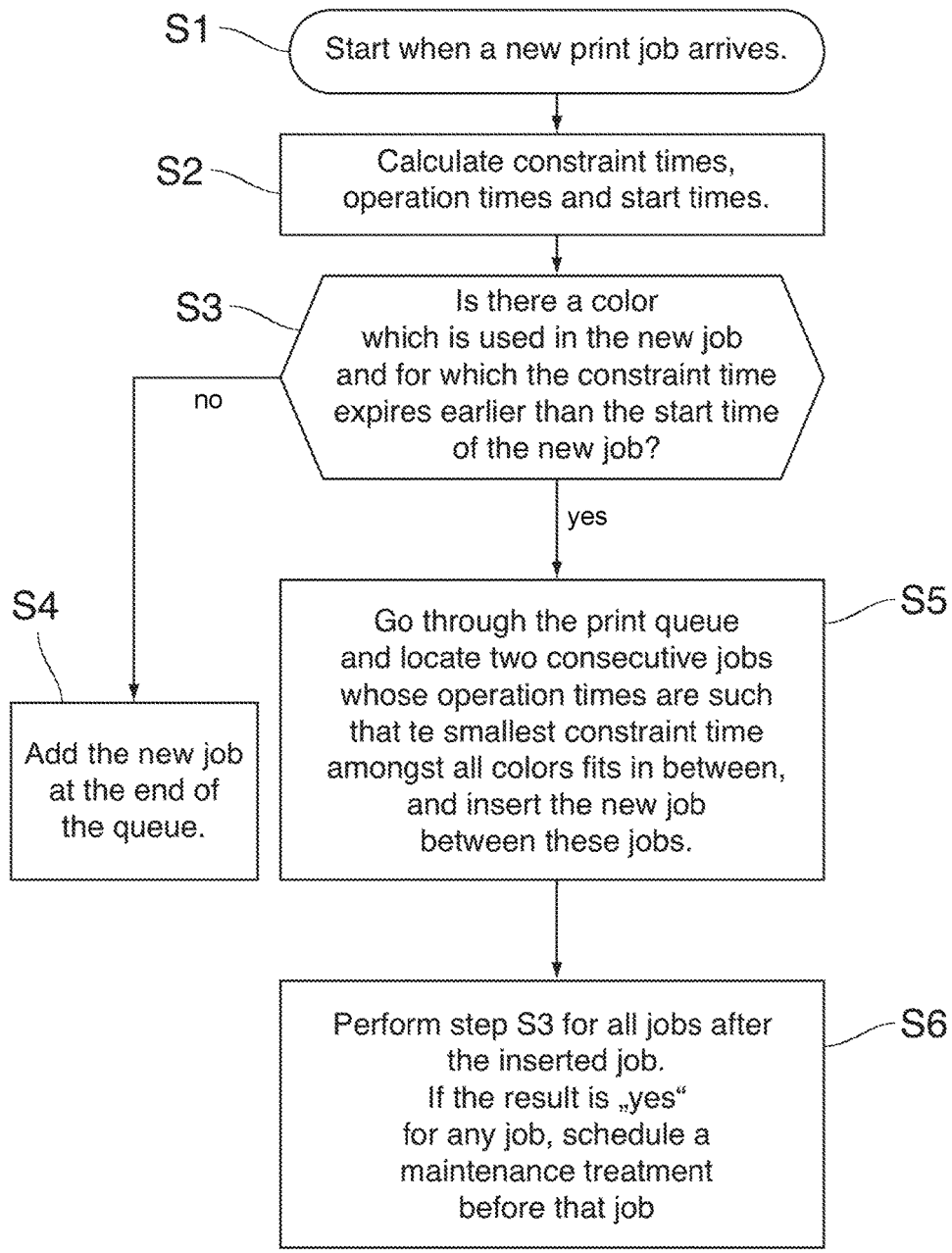
FIG. 5 is a flow diagram showing essential steps of a method according to an embodiment of the invention.

An example of a scheduling method according to the invention as described above has been illustrated in a flow diagram in FIG. 5.

The process starts with step S1 when a new print job arrives and is to be scheduled.

In step S2, the constraint times, the operation times and the start times are calculated for all jobs in the queue (if they have not been calculated already in an earlier run of the process), and also for the new job to be scheduled.

In step S3, it is checked whether there is at least one color (among the five colors which the printer is capable of printing with) which is used in the new job and for which the constraint time (as updated in step S2) expires earlier than the start time of the new job. If that is not the case ("no"), the new job can safely be printed even when it is placed at the end of the print queue, and, accordingly, the new job is added at the end of the print queue in step S4.

Otherwise, i.e. in case of the answer "yes" in step S3, the print queue is searched in step S5 for a pair of consecutive jobs which fulfill the condition that the smallest constraint time amongst all colors ($Tc_W$ in the above example) falls between the operation times of the two jobs. It is observed that such a pair of jobs must always exist, so that the step S5 will always have a definite result.

Then, in order to make sure that the re-arrangement of the print queue has not caused any conflict for another print job further down in the queue, a step S6 is performed which consists in making the same check as in step S3 for all jobs that follow after the position where the new job has been inserted in step S5. Of course, the term "new job" in the language of step S3 has to be replaced by the respective job among the jobs tested in step S6. In other words, it is checked for each job after the inserted job whether there is a color which is used in the job and for which the constraint time expires earlier than the start time of the job. As soon as a job is found for which the result is "yes", a maintenance treatment is scheduled before that job. If no job is found for which the result is yes, then the sequence obtained in step S5 is maintained, and the jobs will be processed in that order.

A modified example of a method according to the invention will now be described by reference to FIG. 6. In the left column in FIG. 6, three jobs "a", "b" and "c" have already been scheduled, and the last job "d" fulfills the requirement that the start time Ts of the new job "d" is earlier than the earliest constraint time Tc as the constraint time $Tc_W$ is disregarded as job "d" does not utilize the color W. Consequently, the jobs could be printed without risk of failure. It is observed however that the constraint time $Tc_W$ would be reached during the processing of the job "d", and it can be anticipated that if the next job to be added requires white ink, there will be a conflict to be dealt with (for example if the new job arrives only after jobs "a", "b", and "c" have been completed and job "d" is being printed.

Figure 6:
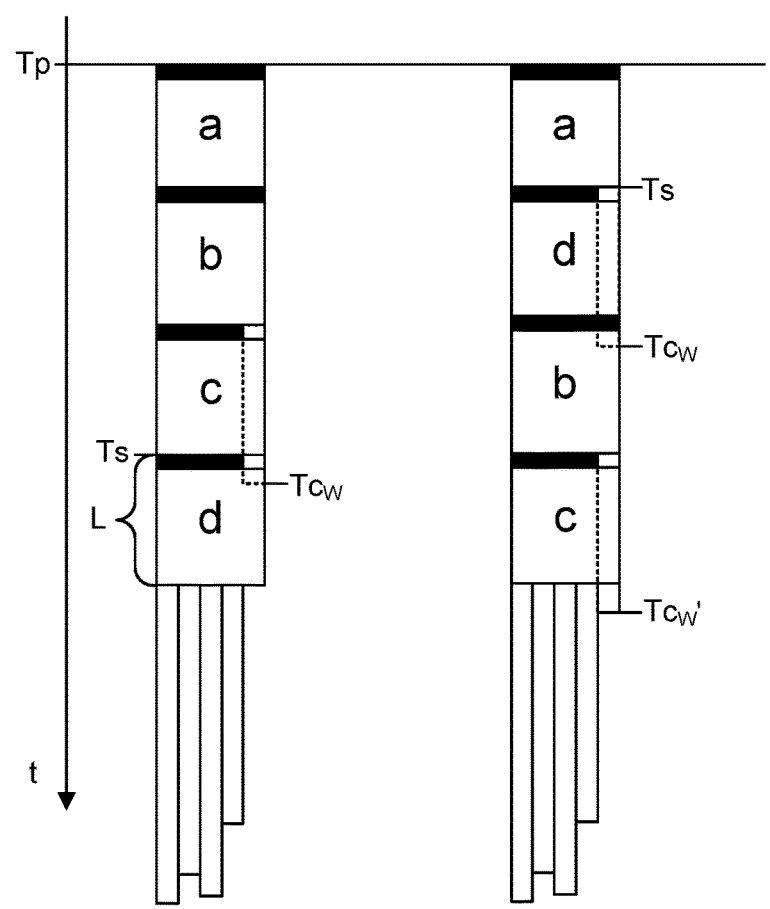

Therefore, in this embodiment, a pre-emptive move is made in that the new job "d" is shifted to the position between "a" and "b", as is shown in the right column in FIG. 6. This has the advantage that job "b" will extend the constraint time for white to $Tc_W'$, so that at least one new job could be added without risk of conflict. The condition for this pre-emptive move of job "d" is that, when the new job does not use a certain color (white in this example), there is a pair of consecutive print jobs in the queue that do use this color, and the failure time Tf of this color is larger than the job length L of the new job "d". Under that condition, the new job "d" will end before $Tc_W$ so that the job "b" can start before the constraint time has expired.

Figure 7:
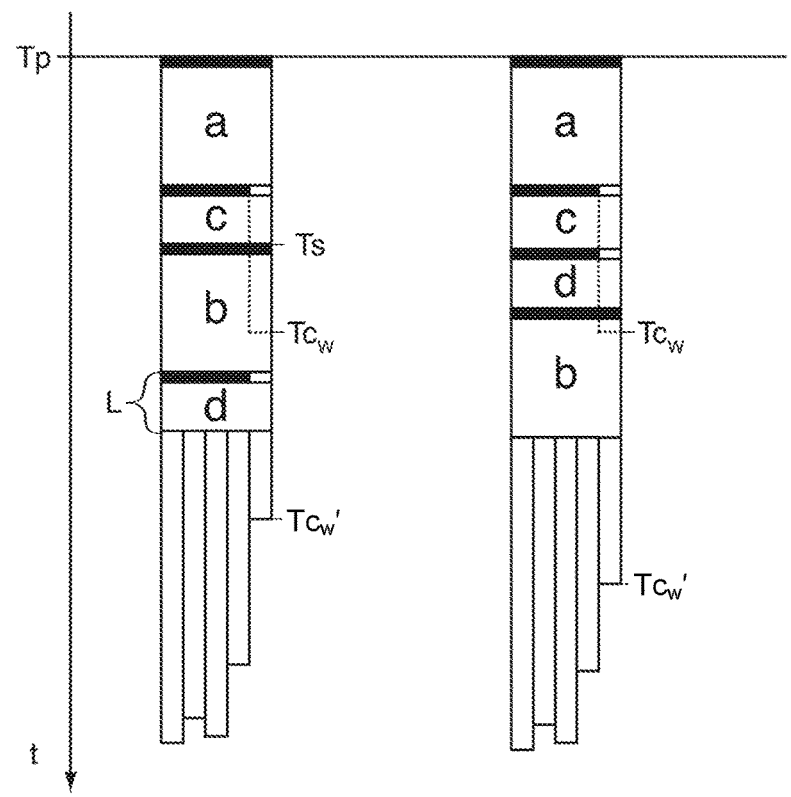

As is illustrated in FIG. 7, multiple jobs may under certain conditions be pre-emptively moved. The left column in FIG. 7 illustrates a situation in which job "c" has pre-emptively been moved between jobs "a" and "b" according to the method described above, but with the difference that the job length of the job "c" is smaller. Now, another job "d" with a relatively small job length is added, and this job does not utilize the color W. Because the job "d" is so short, it still fits in the interval between the start time Ts of the job "b" and the constraint time $Tc_W$ as determined by job "a". Thus, job "d" can also be pre-emptively moved as is shown in the right column in FIG. 7. The advantageous result is that the constraint time is delayed even further and now becomes $Tc'_W$ which provides even more time for accommodating new jobs without conflict.

FIG. 8 illustrates a modified situation in which a new job "d" is added which does not use white color, but the queue contains already three jobs "a", "b" and "c" which do use white ink. In a first step (second column) the new job "d" is pre-emptively moved before the last job "c" in the queue. However, the pair of jobs "a" and "b" also fulfill the condition for pre-emptively moving job "d", so that a second step can be made, moving "d" before "b", as is shown in the third column in FIG. 8. The latter swap does not extend the new constraint time $Tc'_W$ further but has the advantage that it provides more options for further pre-emptive moves (before job "c") when new jobs arrive.

In cases where there are two or more colors which are not used in the new job to be scheduled, the swap condition must be fulfilled for each of these colors.

In the examples described so far, the operation time To which determines the constraint times has been taken to be the time at which a job ends, whereas the criterion for deciding whether nozzle failures must be expected is based on the start time of the job. There may however be cases where the printing elements for a given color do not actually start operating at the start time of job and/or do not keep operating until the end of the job. This possibility can be taken into account by making the failure times ($Tf_y$, etc.) so long that they include a sufficient safety margin that is longer than the job lengths L. Another possibility is to calculate the constraint time from the start time of a job and to decide whether nozzle failures must be expected on the basis of the criterion that the end time of the job must be earlier than the earliest constraint time. In that case, the operation times To would be identical with the start times rather than with the end times of the jobs. Similarly, any time between the start time and the end time of a job may be defined as the operation time.

In a more refined embodiment, it is even possible to consider the start times and the operation times independently for each color. An example has been given in FIG. 9 where the time intervals where printing elements for each color are operating have been indicated by hatched areas. Thus, within one and the same job each color has its own start time ($Ts_Y$-$Ts_W$) and its own end time or operating time $To_Y$-$To_W$). In that case, the methods described above can be employed analogously, but the criterion whether nozzle failures must be expected will have to be checked separately for each color, and the constraint times will have to be based on the related color-specific operation times.

Of course, the two methods illustrated in FIGS. 3 to 5 on the one hand and FIGS. 6 to 9 on the other hand may be combined. Then it will depend upon the respective situation which of the available measures is taken.

If there are too many print jobs which do not use a certain color, a maintenance treatment may be inevitable. However, when new jobs arrive which do utilize this color, the situation may change and it may be possible to rearrange the print queue so that the maintenance treatment becomes obsolete and can be cancelled. A method or several methods for automatically rearranging the print queue may be implemented in the scheduler (12). In another embodiment the scheduler may provide an option to edit the print queue manually and may just alert the user or operator when a maintenance treatment becomes necessary.

What is claimed is:

1. A method of scheduling print jobs for printing in a scheduled order on a printer which has printing elements provided for printing in a number of different colors, the method comprising the steps of:
  a) calculating, for each color, a constraint time which specifies a time at which the printing elements for the respective color should be either operated or subjected to a maintenance treatment in order to avoid a risk of malfunction, due to causes such as ink drying out in the printing element;
  b) calculating, for each of a plurality of print jobs that have been scheduled already and are waiting in a print queue, an operation time at which the printing elements will be operating in the course of the processing of the print job; and
  c) when a new print job is to be scheduled and the print jobs, including the new print job, comprise at least one job in which printing elements for at least one color are not operated, determining a sequence of the print jobs in the print queue, with corresponding calculation of the new constraint times and new operation times, with an aim to extend the constraint times by operating the printing elements before expiry of their previously calculated constraint times by shifting the constraint times to the future due to the usage of the corresponding colors.

2. The method according to claim 1, wherein the step c) comprises a sub step of:
  c1) when a start time of the new print job is later than the latest constraint time, searching the print queue for a pair of consecutive print jobs whose operation times are such that the smallest constraint time amongst all colors fits in between the operation times, and inserting the new print job between the jobs of this pair.

3. The method according to claim 2, wherein the step c) comprises the further steps of:
  c2) checking, for all jobs in the print queue that follow behind the new print job that has been inserted, whether there is a color which is used in the job and for which the constraint time expires earlier than the start time of the job; and
  c3) when a job is found for which the result in step c2) is "yes," scheduling a maintenance treatment before that job.

4. The method according to claim 3, wherein the step c) comprises the following sub-steps:
  c_a) preliminarily appending the new print job at the end of the print queue;
  c_b) if the new print job does not utilize a certain color and the preceding job in the queue uses that certain color, and if the preceding job fulfills a swap criterion requiring that the job length of the new print job fits in the interval between the start time of the preceding job and the constraint time for the given color, then swap the positions of the new print job and the preceding job.

5. A printing system comprising a job scheduler configured to perform the steps of the method according to claim 3.

6. A computer program product comprising program code on a machine-readable non-transitory medium, the program code, when run on a scheduler of a printing system, is configured to instruct the scheduler to perform the steps of the method according to claim 3.

7. The method according to claim 2, wherein the step c) comprises the following sub-steps:
   c_a) preliminarily appending the new print job at the end of the print queue;
   c_b) if the new print job does not utilize a certain color and the preceding job in the queue uses that certain color, and if the preceding job fulfills a swap criterion requiring that the job length of the new print job fits in the interval between the start time of the preceding job and the constraint time for the given color, then swap the positions of the new print job and the preceding job.

8. A printing system comprising a job scheduler configured to perform the steps of the method according to claim 7.

9. A printing system comprising a job scheduler configured to perform the steps of the method according to claim 1.

10. A printing system comprising a job scheduler configured to perform the steps of the method according to claim 2.

11. A computer program product comprising program code on a machine-readable non-transitory medium, the program code, when run on a scheduler of a printing system, is configured to instruct the scheduler to perform the steps of the method according to claim 2.

12. The method according to claim 1, wherein the step c) comprises the following sub-steps:
   c_a) preliminarily appending the new print job at the end of the print queue;
   c_b) if the new print job does not utilize a certain color and the preceding job in the queue uses that certain color, and if the preceding job fulfills a swap criterion requiring that the job length of the new print job fits in the interval between the start time of the preceding job and the constraint time for the given color, then swap the positions of the new print job and the preceding job.

13. A printing system comprising a job scheduler configured to perform the steps of the method according to claim 12.

14. The method according to claim 12, wherein the step c) comprises a further step of reiterating the step c_b) if the job in the print queue which precedes the new print job after swapping also fulfills the swap criterion.

15. A printing system comprising a job scheduler configured to perform the steps of the method according to claim 14.

16. A computer program product comprising program code on a machine-readable non-transitory medium, the program code, when run on a scheduler of a printing system, is configured to instruct the scheduler to perform the steps of the method according to claim 14.

17. A computer program product comprising program code on a machine-readable non-transitory medium, the program code, when run on a scheduler of a printing system, is configured to instruct the scheduler to perform the steps of the method according to claim 12.

18. A computer program product comprising program code on a machine-readable non-transitory medium, the program code, when run on a scheduler of a printing system, is configured to instruct the scheduler to perform the steps of the method according to claim 1.

19. A computer program product comprising program code on a machine-readable non-transitory medium, the program code, when run on a scheduler of a printing system, is configured to instruct the scheduler to perform the steps of the method according to claim 7.

\* \* \* \* \*